(12) United States Patent
Watanabe et al.

(10) Patent No.: US 11,486,458 B2
(45) Date of Patent: Nov. 1, 2022

(54) CLUTCH UNIT

(71) Applicant: NTN Corporation, Osaka (JP)

(72) Inventors: Kengo Watanabe, Shizuoka (JP); Eiji Maeno, Shizuoka (JP); Yasumasa Hibi, Shizuoka (JP)

(73) Assignee: NTN CORPORATION, Osaka (JP)

(*) Notice: Subject to any disclaimer, the term of this patent is extended or adjusted under 35 U.S.C. 154(b) by 16 days.

(21) Appl. No.: 16/962,945

(22) PCT Filed: Jan. 29, 2019

(86) PCT No.: PCT/JP2019/003015
§ 371 (c)(1),
(2) Date: Jul. 17, 2020

(87) PCT Pub. No.: WO2019/151261
PCT Pub. Date: Aug. 8, 2019

(65) Prior Publication Data
US 2021/0372495 A1  Dec. 2, 2021

(30) Foreign Application Priority Data

Jan. 30, 2018 (JP) .............................. JP2018-013637
Sep. 7, 2018 (JP) .............................. JP2018-167880

(51) Int. Cl.
*B60N 2/16* (2006.01)
*F16D 41/08* (2006.01)
(Continued)

(52) U.S. Cl.
CPC .............. *F16D 67/02* (2013.01); *B60N 2/165* (2013.01); *F16D 15/00* (2013.01); *F16D 63/006* (2013.01)

(58) Field of Classification Search
CPC ........ F16D 67/02; F16D 15/00; F16D 63/006; B60N 2/165; B60N 2/168
See application file for complete search history.

(56) References Cited

U.S. PATENT DOCUMENTS 9,333,882 B2 * 5/2016 Line ..................... B60N 2/2222
9,706,844 B2 * 7/2017 Sakurai ................. A47C 1/024
(Continued)

FOREIGN PATENT DOCUMENTS

JP         5207779       6/2013
JP      2017-171007     9/2017
(Continued)

OTHER PUBLICATIONS

International Preliminary Report on Patentability and Written Opinion of the International Searching Authority dated Aug. 4, 2020 in International (PCT) Application No. PCT/JP2019/003015.
(Continued)

*Primary Examiner* — Stacey A Fluhart
*Assistant Examiner* — Farhana Pervin
(74) *Attorney, Agent, or Firm* — Wenderoth, Lind & Ponack, L.L.P.

(57) ABSTRACT

A brake-side clutch part includes an outer ring whose rotation is restricted and an output shaft from which rotation is output. The outer ring is provided with a slide gear that meshes with the output shaft when rotational torque is cut off and releases a meshing state with the output shaft when rotational torque is transmitted. The output shaft is provided with an inner gear that meshes with the slide gear so as to be slightly rotatable. An alignment part that aligns a phase of the inner gear with that of the slide gear when rotational torque is cut off, and a centering part that returns the inner gear to a neutral position with respect to the output shaft when rotational torque is transmitted are provided between the inner gear and the output shaft.

6 Claims, 16 Drawing Sheets

(51) Int. Cl.
      *F16D 67/02*     (2006.01)
      *F16D 15/00*     (2006.01)
      *F16D 63/00*     (2006.01)

(56) References Cited

U.S. PATENT DOCUMENTS

| | | | |
|---|---|---|---|
| 11,142,099 B2 * | 10/2021 | Kajino | B60N 2/165 |
| 2013/0300174 A1 * | 11/2013 | Ito | B60N 2/2252 |
| | | | 297/354.1 |
| 2019/0032728 A1 | 1/2019 | Sato et al. | |
| 2019/0047444 A1 | 2/2019 | Sato et al. | |
| 2019/0210489 A1 | 7/2019 | Sato | |

FOREIGN PATENT DOCUMENTS

| | | | | |
|---|---|---|---|---|
| JP | 2017-172590 | 9/2017 | | |
| JP | 2018-35847 | 3/2018 | | |
| WO | WO-2017159431 A1 * | 9/2017 | | B60N 2/938 |

OTHER PUBLICATIONS

International Search Report dated May 14, 2019 in International (PCT) Application No. PCT/JP2019/003015.
Extended European Search Report dated Sep. 22, 2021 in corresponding European Patent Application No. 19746941.4.

* cited by examiner

CLUTCH UNIT

TECHNICAL FIELD

The present invention relates to a clutch unit including an input-side clutch part to which rotational torque is input and an output-side clutch part which transmits the rotational torque from the input-side clutch part to an output side and cuts off rotational torque from the output side.

BACKGROUND ART

In a clutch unit using an engagement element such as a cylindrical roller or a ball, a clutch part is provided between an input member and an output member. The clutch part is configured to control transmission and cutoff of rotational torque by engaging and disengaging the engagement element between the input member and the output member.

The present applicant has previously proposed a clutch unit incorporated in an automobile seat lifter that performs up-down adjustment of a seat by lever operation (for example, see Patent Literature 1).

The clutch unit disclosed in Patent Literature 1 includes a lever-side clutch part to which rotational torque is input by lever operation and a brake-side clutch part that transmits the rotational torque from the lever-side clutch part to an output side and cuts off rotational torque from the output side.

CITATIONS LIST

Patent Literature

Patent Literature 1: Japanese Patent No. 5207779

SUMMARY OF INVENTION

Technical Problems

By the way, in the conventional clutch unit disclosed in Patent Literature 1, when rotational torque is reversely input to an output shaft by being seated on the seat, cylindrical rollers of the brake-side clutch part engage with a wedge clearance between the output shaft and an outer ring, so that the output shaft is locked to the outer ring. Thereby, a seat height of the seat is maintained.

Here, in a state where the output shaft is locked only by the cylindrical rollers of the brake-side clutch part, when an impact load is reversely input to the output shaft at the time of a vehicle collision, the cylindrical rollers are repelled from the wedge clearance between the output shaft and the outer ring. Since the cylindrical rollers are separated from the wedge clearance, it becomes difficult to secure the locked state of the output shaft.

In addition, in the clutch unit incorporated in the automobile seat lifter, when vertical vibrations occur during running of the vehicle on a rough road or the like in a state of being seated on the seat, rotational torque in a forward direction and rotational torque in a reverse direction are reversely input to the output shaft in an alternately continuous state.

At this time, in the brake-side clutch part, contact positions of the cylindrical rollers in the wedge clearance between the output shaft and the outer ring are slightly shifted, or there is hysteresis of elastic deformation on the output shaft on which rotational torque is loaded, the outer ring and the cylindrical rollers, so that the output shaft gradually rotates. As a result, a phenomenon that the seat is slightly lowered may occur.

Therefore, the present invention has been proposed in view of the above-described problems, and an object thereof is to provide a clutch unit having a structure that keeps an output shaft locked even when an impact load is reversely input to the output shaft or even when rotational torque in forward and reverse directions is reversely input to the output shaft continuously.

Solutions to Problems

A clutch unit according to the present invention has a basic configuration including: an input-side clutch part that controls transmission and cutoff of input rotational torque; and an output-side clutch part that transmits rotational torque from the input-side clutch part to an output side and cuts off rotational torque reversely input from the output side.

The output-side clutch part of the present invention comprises a stationary member whose rotation is restricted and an output member from which rotation is output, the stationary member is provided with a female gear member that meshes with the output member when rotational torque is cut off and releases a meshing state with the output member when rotational torque is transmitted, and the output member is provided with a male gear member that meshes with the female gear member so as to be slightly rotatable.

In the output-side clutch part, since the female gear member provided in the stationary member meshes with the male gear member of the output member, when rotational torque is cut off, even when an impact load is reversely input to the output member or even when rotational torque in forward and reverse directions is reversely input to the output member in an alternately continuous state, so that the output member can be kept locked.

Further, in the output-side clutch part of the present invention, an alignment part that aligns a phase of the male gear member with a phase of the female gear member when rotational torque is cut off and a centering part that returns the male gear member to a neutral position with respect to the output member when rotational torque is transmitted are provided between the male gear member and the output member.

When the rotational torque is cut off, even if the female gear member and the male gear member do not mesh with each other due to a phase shift between the female gear member and the male gear member, the alignment part slightly rotates the male gear member with respect to the output member, so that the male gear member can be meshed with the female gear member.

When the rotational torque is cut off, the male gear member whose phase has been aligned with that of the female gear member by the alignment part is in a state of being displaced in a rotation direction with respect to the output member. In this case, when the rotational torque is transmitted, the centering part slightly rotates the male gear member with respect to the output member, so that the male gear member can be returned to the neutral position with respect to the output member.

It is desirable that the alignment part in the present invention have a structure which includes a flat surface formed on the output member and an inclined surface formed on the male gear member and in which the inclined surface is made to abut on the flat surface.

If such a structure is adopted, phase alignment is performed by slightly rotating the male gear member with respect to the output member between an abutment state and a close contact state of the flat surface of the output member and the inclined surface of the male gear member. With such a simple structure, the phase alignment of the male gear member with the output member can be easily realized.

It is desirable that the centering part in the present invention have a structure in which a storing part is formed between the output member and the male gear member and an elastic member that elastically biases the male gear member toward the output member in the rotation direction is disposed in the storing part.

If such a structure is adopted, centering is performed by slightly rotating the male gear member, which is displaced in the rotation direction with respect to the output member, with respect to the output member by elastic force of the elastic member. With such a simple structure, the centering of the male gear member with respect to the output member can be easily realized.

It is desirable that the elastic member in the present invention have a structure which has a C-shape having both ends bent and extended in an axial direction and in which both the ends are inserted into the storing part and locked in the rotation direction.

If such a structure is adopted, the C-shaped elastic member can be easily assembled to the centering part of the output-side clutch part, so that assemblability of the elastic member is improved.

In the present invention, it is desirable to have a structure in which either of the male gear member and the female gear member is provided with a guide part that axially aligns the female gear member with the male gear member when the female gear member moves in the axial direction.

If such a structure is adopted, the guide part allows the female gear member to be axially aligned with the male gear member when the female gear member moves in the axial direction. As a result, it is possible to prevent axial misalignment of the female gear member with the male gear member and to mesh the male gear member with the female gear member.

It is desirable that the input-side clutch part and the output-side clutch part in the present invention be incorporated in an automobile seat lifter.

If such a structure is adopted, in the automobile seat lifter, in a state of being seated on a seat, even when an impact load is reversely input to the output member at the time of a vehicle rear-end collision, or even when forward and reverse rotational torque is reversely input to the output member continuously due to vertical vibrations generated during running of the vehicle on a rough road or the like, the output member can be kept locked, and a seat height of the seat can be maintained.

Advantageous Effects of Invention

According to the present invention, since the female gear member provided in the stationary member meshes with the male gear member of the output member, when rotational torque is cut off, even when an impact load is reversely input to the output member, or even when rotational torque in forward and reverse directions is reversely input to the output member in an alternately continuous state, so that the output member can be kept locked.

Also, when the rotational torque is cut off, even if there is a phase shift between the female gear member and the male gear member, the alignment part slightly rotates the male gear member with respect to the output member, so that the male gear member can be meshed with the female gear member.

Further, when the rotational torque is transmitted, the centering part slightly rotates the male gear member with respect to the output member, so that the male gear member can be returned to the neutral position with respect to the output member.

DESCRIPTION OF EMBODIMENTS

Embodiments of a clutch unit according to the present invention will be described in detail with reference to the drawings. In the following embodiments, the clutch unit incorporated in an automobile seat lifter will be described as an example, but it is also applicable to other than the automobile seat lifter.

Figure 1:
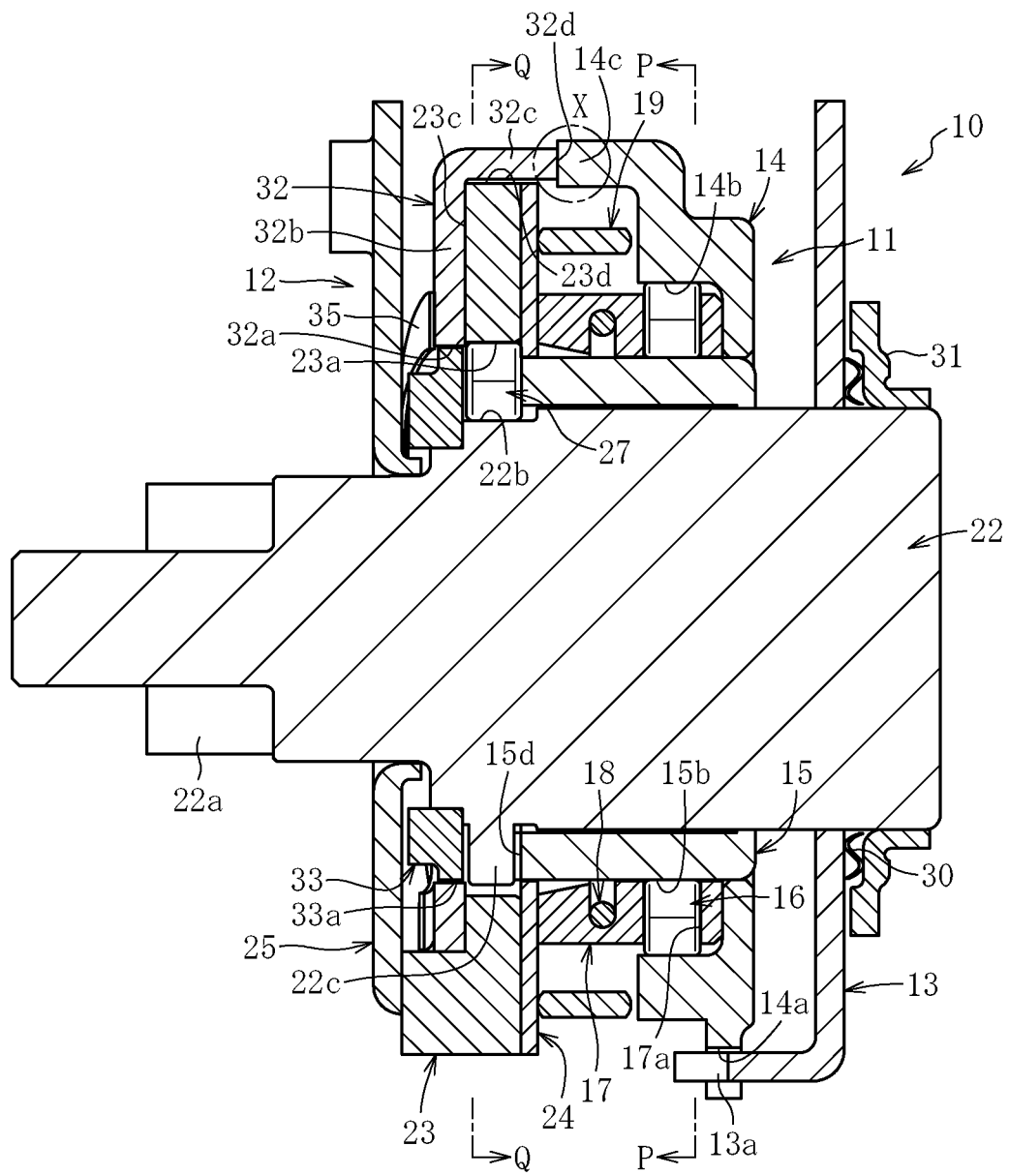
FIG. 1 is a cross-sectional view showing an overall configuration of a clutch unit in an embodiment of the present invention.
Figure 2:
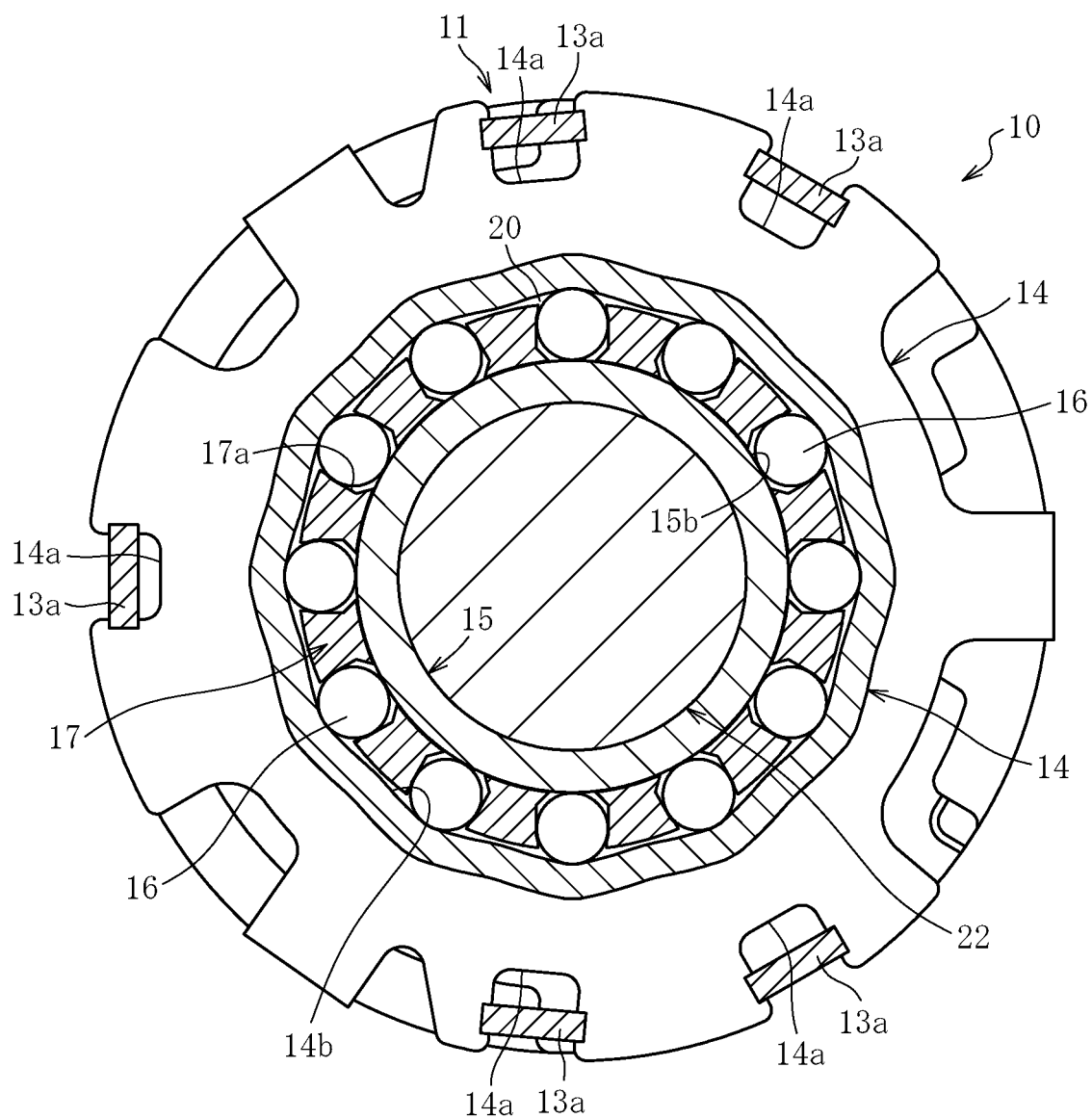
FIG. 2 is a cross-sectional view taken along a line P-P in FIG. 1.
Figure 3:
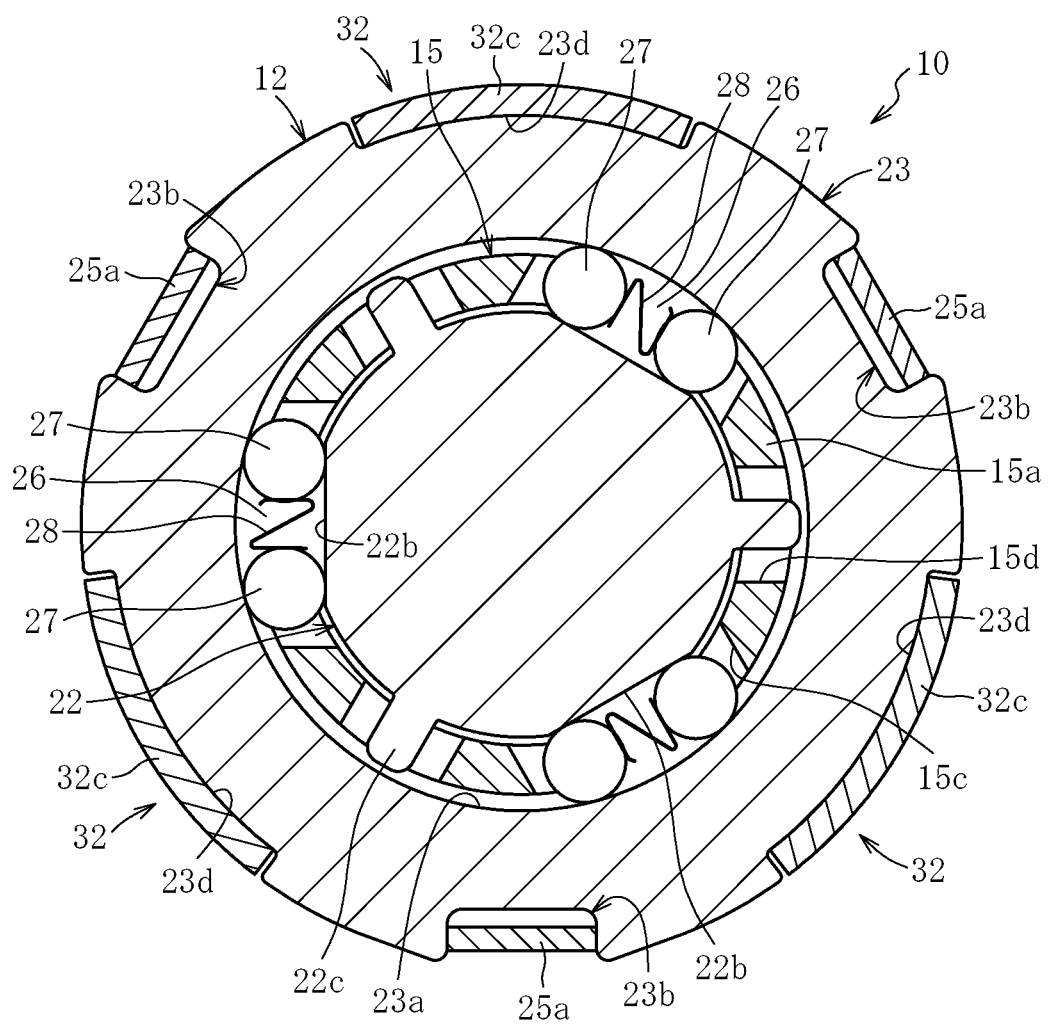
FIG. 3 is a cross-sectional view taken along a line Q-Q in FIG. 1.

FIG. 1 is a cross-sectional view showing an overall configuration of the clutch unit, FIG. 2 is a cross-sectional view taken along a line P-P in FIG. 1, and FIG. 3 is a cross-sectional view taken along a line Q-Q in FIG. 1. Before a characteristic configuration of this embodiment is described, the overall configuration of the clutch unit will be described.

As shown in FIG. 1, a clutch unit 10 of this embodiment has a structure in which a lever-side clutch part 11 as an input-side clutch part and a brake-side clutch part 12 as an output-side clutch part are unitized.

The lever-side clutch part 11 controls transmission and cutoff of rotational torque input by lever operation. The brake-side clutch part 12 transmits rotational torque from the lever-side clutch part 11 to an output side, and has a reverse input cutoff function of cutting off rotational torque reversely input from the output side.

As shown in FIGS. 1 and 2, a main part of the lever-side clutch part 11 includes a side plate 13 and an outer ring 14, an inner ring 15, a plurality of cylindrical rollers 16, a cage 17, an inner centering spring 18, and an outer centering spring 19.

The side plate 13 and the outer ring 14 are united by fitting and caulking claws 13a formed on an outer peripheral edge of the side plate 13 into cut-away recesses 14a formed on an outer peripheral edge of the outer ring 14, and rotational torque is input by lever operation.

A plurality of cam surfaces 14b is formed on an inner periphery of the outer ring 14 at equal intervals in a circumferential direction. The input of the rotational torque to the outer ring 14 is performed by an operating lever 43 (see FIG. 4) attached to the side plate 13 by a screw or the like.

The inner ring 15 has a cylindrical shape through which an output shaft 22 is inserted, and has a plurality of pillars 15a (see FIG. 3) having its brake-side end protruding in an axial direction. The inner ring 15 transmits the rotational torque input from the outer ring 14 to the brake-side clutch part 12.

A wedge clearance 20 is formed between a cylindrical outer peripheral surface 15b of the inner ring 15 and the cam surfaces 14b formed on the inner periphery of the outer ring 14.

The cylindrical rollers 16 control transmission and cutoff of the rotational torque from the outer ring 14 by engaging with and disengaging from the wedge clearance 20 formed between the cam surfaces 14b of the outer ring 14 and the outer peripheral surface 15b of the inner ring 15.

In the cage 17, a plurality of pockets 17a for accommodating the cylindrical rollers 16 is formed at equal intervals in the circumferential direction. By this cage 17, the cylindrical rollers 16 are held at equal intervals in the circumferential direction in the wedge clearance 20 between the cam surfaces 14b of the outer ring 14 and the outer peripheral surface 15b of the inner ring 15.

The inner centering spring 18 is a C-shaped elastic member having a circular cross section housed inside the cage 17, and has both ends locked to the cage 17 and a part of a cover 24 of the brake-side clutch part 12.

When the rotational torque is input from the outer ring 14 by lever operation, the inner centering spring 18 is pushed and expanded with rotation of the cage 17 following the outer ring 14 with respect to the cover 24 in a stationary state, thereby accumulating elastic force. When the input of the rotational torque from the outer ring 14 is stopped, the cage 17 returns to a neutral state by the elastic force of the inner centering spring 18.

The outer centering spring 19 located radially outside the cage 17 is a C-shaped strip elastic member disposed between the outer ring 14 and the above cover 24, and has both ends locked to the outer ring 14 and a part of the cover 24.

When the rotational torque is input from the outer ring 14 by lever operation, the outer centering spring 19 is pushed and expanded with rotation of the outer ring 14 with respect to the cover 24 in a stationary state, thereby accumulating elastic force. When the input of the rotational torque from the outer ring 14 is stopped, the outer ring 14 returns to a neutral state by the elastic force of the outer centering spring 19.

As shown in FIGS. 1 and 3, a main part of the brake-side clutch part 12 includes the pillars 15a of the inner ring 15 extending from the lever-side clutch part 11, the output shaft 22 as an output member, an outer ring 23 as a stationary member, the cover 24 and a side plate 25, and a plurality of pairs (three pairs in the figure) of cylindrical rollers 27 and a leaf spring 28 having an N-shaped cross section.

The output shaft 22 has a pinion gear 22a formed coaxially at an output-side end thereof. The output shaft 22 has the inner ring 15 externally fitted thereto, and outputs rotational torque from the lever-side clutch part 11.

Figure 4:
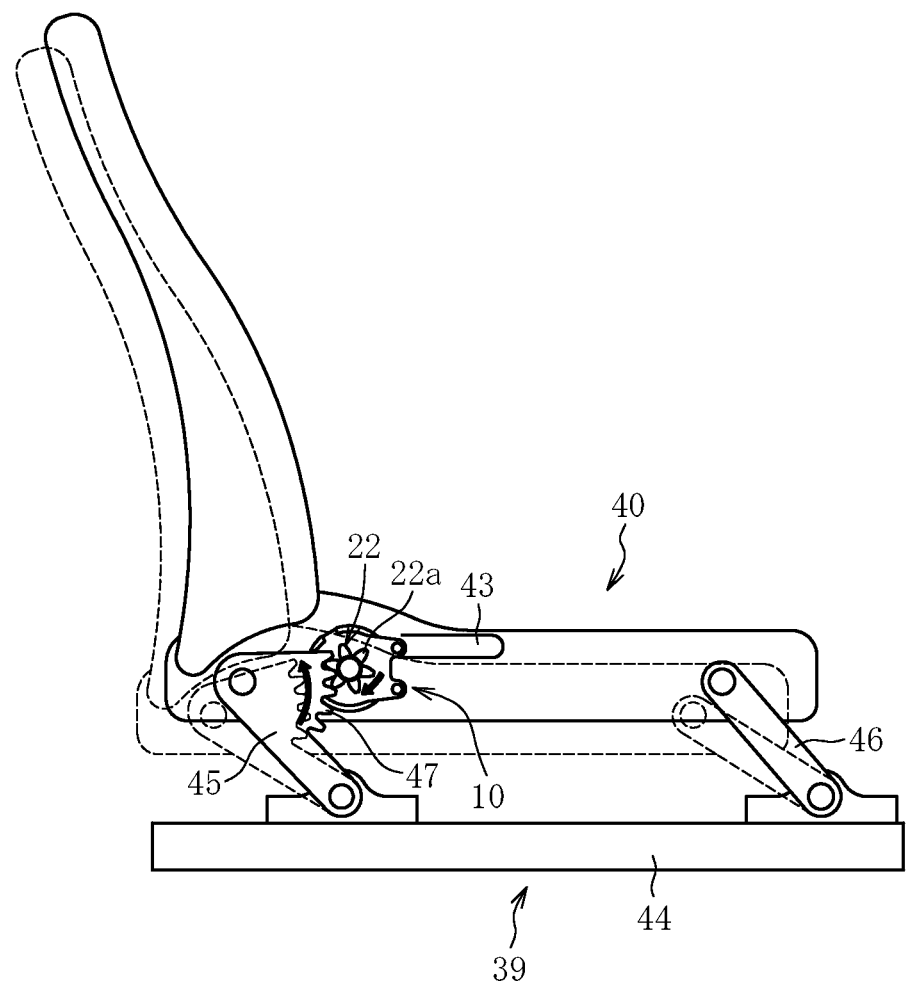
FIG. 4 is a configuration view showing a seat and a seat lifter of an automobile.

The pinion gear 22a of the output shaft 22 is connected to a seat lifter 39 (see FIG. 4). By pressing a washer 31 into an input-side end of the output shaft 22 via a wave washer 30, the components of the lever-side clutch part 11 are prevented from coming off.

On an outer periphery of the output shaft 22, a plurality of flat cam surfaces 22b is formed at equal intervals in the circumferential direction. A wedge clearance 26 is formed between the cam surfaces 22b and a cylindrical inner peripheral surface 23a of the outer ring 23.

Two cylindrical rollers 27 and one leaf spring 28 interposed therebetween are arranged in the wedge clearance 26. The cylindrical rollers 27 control cutoff of rotational torque reversely input from the output shaft 22 and transmission of rotational torque input from the inner ring 15 by engaging with and disengaging from the wedge clearance 26. The leaf spring 28 urges the pair of cylindrical rollers 27 to exert separating force in the circumferential direction.

The cylindrical rollers 27 and the leaf spring 28 are arranged at equal intervals in the circumferential direction by the pillars 15a of the inner ring 15 having a function of transmitting rotational torque input from the outer ring 14 to the output shaft 22. In other words, the pillars 15a of the inner ring 15 have a function of accommodating the cylindrical rollers 27 and the leaf spring 28 in a pocket 15c and holding them at equal intervals in the circumferential direction.

The output shaft 22 is provided with a projection 22c for transmitting rotational torque from the inner ring 15 to the output shaft 22. The projection 22c is arranged at three locations on the outer periphery located between the adjacent cam surfaces 22b so as to protrude in a radial direction.

On the other hand, a recessed hole 15d in which the projection 22c of the output shaft 22 is inserted and arranged with a clearance in the circumferential direction is provided in the pillar 15a located at the brake-side end of the inner ring 15.

The outer ring 23, the cover 24, and the side plate 25 are integrated by fitting and caulking claws 25a formed on an outer peripheral edge of the side plate 25 into cut-away recesses 23b formed on an outer peripheral edge of the outer ring 23 and cut-away recesses (not shown) formed on an outer peripheral edge of the cover 24.

An operation example of the lever-side clutch part 11 and the brake-side clutch part 12 having the above structure will be described below.

In the lever-side clutch part 11, when rotational torque is input to the outer ring 14 by lever operation, the cylindrical rollers 16 engage with the wedge clearance 20 between the outer ring 14 and the inner ring 15. Due to the engagement of the cylindrical rollers 16 with the wedge clearance 20, the rotational torque is transmitted to the inner ring 15, and the inner ring 15 rotates. At this time, elastic force is accumulated in both the centering springs 18 and 19 with the outer ring 14 and the cage 17 rotate.

When the input of the rotational torque by the lever operation is stopped, the cage 17 and the outer ring 14 return to a neutral state by the elastic force of the centering springs 18 and 19. On the other hand, the inner ring 15 maintains a given rotational position as it is. Accordingly, the inner ring 15 performs inching rotation by repeated rotation of the outer ring 14 due to pumping operation of the operating lever 43.

In the brake-side clutch part 12, even when rotational torque is reversely input to the output shaft 22 by being seated on a seat 40 (see FIG. 4), the cylindrical rollers 27 are engaged with the wedge clearance 26 between the output shaft 22 and the outer ring 23, and the output shaft 22 is locked to the outer ring 23.

In this way, recirculation of the rotational torque reversely input from the output shaft 22 to the lever-side clutch part 11 is interrupted due to the locking in the brake-side clutch part 12. As a result, a seat height of the seat 40 is maintained.

On the other hand, when rotational torque from the lever-side clutch part 11 is input to the inner ring 15 by lever operation, the pillars 15a of the inner ring 15 abut against the cylindrical rollers 27 and press the cylindrical rollers 27 against elastic force of the leaf spring 28.

As a result, the cylindrical rollers 27 separate from the wedge clearance 26 between the output shaft 22 and the outer ring 23. By the separation of the cylindrical rollers 27 from the wedge clearance 26, the locked state of the output shaft 22 is released, and the output shaft 22 becomes rotatable.

Also, when the inner ring 15 further rotates, a clearance between the recessed hole 15d of the inner ring 15 and the projection 22c of the output shaft 22 is narrowed, and the pillar 15a of the inner ring 15 abuts on the projection 22c of the output shaft 22 in a rotation direction.

Thus, the rotational torque from the lever-side clutch part 11 is transmitted to the output shaft 22 via the pillar 15d of the inner ring 15 and the projection 22c, and the output shaft 22 rotates. In other words, when the inner ring 15 performs inching rotation, the output shaft 22 also performs inching rotation. As a result, the seat height of the seat 40 can be adjusted.

The clutch unit 10 described above is used by being incorporated into the automobile seat lifter 39 that adjusts a seat height of the seat 40 by lever operation. FIG. 4 shows the seat 40 provided in a passenger compartment of an automobile.

As shown in FIG. 4, the seat height of the seat 40 in the seat lifter 39 is adjusted by the operating lever 43 attached to the side plate 13 (see FIG. 1) of the lever-side clutch part 11 in the clutch unit 10. The seat lifter 39 has the following structure.

One end of a link member 45, 46 is pivotally attached to a slide movable member 44. Another end of the link member 45, 46 is pivotally attached to the seat 40. At the other end of the link member 45, a sector gear 47 is provided integrally. The sector gear 47 meshes with the pinion gear 22a of the output shaft 22 of the clutch unit 10.

In the seat lifter 39, for example, in a case of lowering a seat surface of the seat 40, a locked state of the brake-side clutch part 12 (see FIG. 1) is released by lever operation in the lever-side clutch part 11, that is, by swinging the operating lever 43 downward.

By the lock release in the brake-side clutch part 12, the pinion gear 22a of the output shaft 22 is rotated clockwise (a direction of an arrow in FIG. 4) by rotational torque transmitted from the lever-side clutch part 11 to the brake-side clutch part 12.

In the seat lifter 39, the sector gear 47 meshing with the pinion gear 22a swings counterclockwise (a direction of an arrow in FIG. 4), and the link members 45 and 46 are both tilted so that the seat surface of the seat 40 is lowered.

After adjusting the seat height of the seat 40 in this manner, when the operating lever 43 is released, the operating lever 43 swings upward by the elastic force of both the centering springs 18, 19 (see FIG. 1) and returns to an original position (a neutral state).

Note that when the operating lever 43 is swung upward, the seat surface of the seat 40 is raised by operation opposite to that described above. When the operating lever 43 is released after adjusting the seat height of the seat 40, the operating lever 43 swings downward and returns to the original position (neutral state).

Note that the clutch unit 10 shown in FIG. 1 illustrates a structure using the two centering springs 18 and 19 of the inner centering spring 18 for returning the cage 17 to a neutral state and the outer centering spring 19 for returning the outer ring 14 to a neutral state, but the structure may be such that the outer centering spring 19 is omitted and one centering spring corresponding to the inner centering spring 18 is used. As described above, by using the one centering spring, the number of parts in the clutch unit 10 can be reduced.

The one centering spring is a C-shaped strip elastic member disposed radially outside of the cage 17, has a structure in which both ends thereof are locked to the cage 17 and a part of the cover 24 of the brake-side clutch part 12, and has the same function as the inner centering spring 18 in FIG. 1.

The overall configuration of the clutch unit 10 shown in FIG. 1 is as described above, and a characteristic configuration thereof will be described in detail below.

When the output shaft 22 is locked by the brake-side clutch part 12, in a case where an impact load is reversely input during a vehicle rear-end collision in a state of being seated on the seat 40 (see FIG. 4), excessive rotational torque is reversely input to the output shaft 22 instantaneously. Also, when vertical vibrations occur during running of the vehicle on a bad road or the like, rotational torque in a forward direction and rotational torque in a reverse direction are reversely input to the output shaft 22 in an alternately continuous state.

In order to lock the output shaft 22 even when the above-described impact load is reversely input to the output shaft 22 or even when the rotational torque in the forward and reverse directions is reversely input to the output shaft 22 continuously, the brake-side clutch part 12 of the clutch unit 10 in this embodiment has the following structure.

Figure 5:
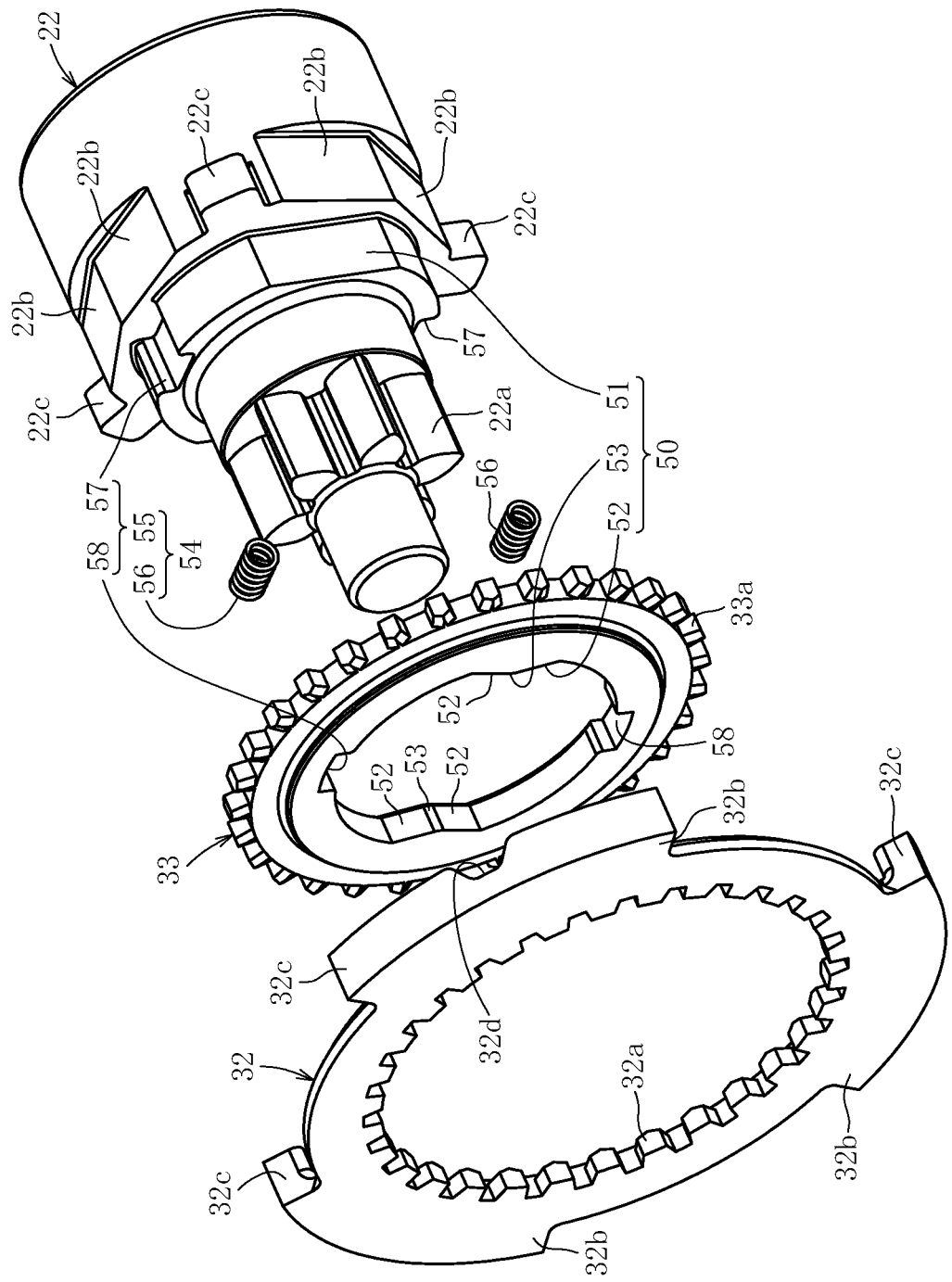
FIG. 5 is an exploded perspective view showing a slide gear, an inner gear, a coil spring, and an output shaft in the clutch unit of FIG. 1.

As shown in FIG. 5, the brake-side clutch part 12 (see FIG. 1) has a structure in which the outer ring 23 is provided with a slide gear 32 as a female gear member that meshes with the output shaft 22 when rotational torque is cut off and releases the meshing state with the output shaft 22 when rotational torque is transmitted, and in which the output shaft 22 is provided with an inner gear 33 meshing with the slide gear 32.

The slide gear 32 is disposed so as to be movable in the axial direction with respect to the output shaft 22. On the other hand, the inner gear 33 is arranged so as not to be movable in the axial direction with respect to the output shaft 22.

The slide gear 32 has a ring shape having teeth 32a (hereinafter referred to as internal teeth) formed on an inner periphery. At a plurality of locations (three locations in FIG. 5) in the circumferential direction of an outer periphery of the slide gear 32, a flange 32b is integrally extended radially outward, and a brim 32c extending integrally from the flange 32b in the axial direction is formed.

On the other hand, a recess 23c corresponding to the flange 32b of the slide gear 32 is formed on an end surface of the outer ring 23 of the brake-side clutch part 12. Further, a recess 23d corresponding to the brim 32c of the slide gear 32 is formed on an outer peripheral surface of the outer ring 23.

The slide gear 32 is assembled to the outer ring 23 by accommodating the flange 32b in the recess 23c on the end surface of the outer ring 23 and fitting the brim 32c into the recess 23d on the outer peripheral surface of the outer ring 23.

By accommodating the flange 32b of the slide gear 32 in the recess 23c of the outer ring 23, axial movement of the slide gear 32 with respect to the outer ring 23 is allowed. Further, by fitting the brim 32c of the slide gear 32 into the recess 23d of the outer ring 23, circumferential movement (rotation) of the slide gear 32 with respect to the outer ring 23 is restricted (see FIG. 3).

In contrast to the slide gear 32 described above, the inner gear 33 has a ring shape having teeth 33a (hereinafter referred to as external teeth) formed on an outer periphery. The external teeth 33a of the inner gear 33 mesh with the internal teeth 32a of the slide gear 32.

Note that although the external teeth 33a of the inner gear 33 shown in FIG. 5 are formed uniformly at a plurality of locations in the circumferential direction over an entire circumference, they may be formed unevenly along the circumferential direction. In other words, the external teeth 33a may not be formed at a location where radial thickness of the inner gear 33 is small, and the external teeth 33a may be formed only at a location where radial thickness is large.

With this configuration, when the internal teeth 32a of the slide gear 32 and the external teeth 33a of the inner gear 33 mesh with each other, stress concentration on the location where the radial thickness of the inner gear 33 is small, that is, a portion where strength is weak can be alleviated, and occurrence of cracks due to the stress concentration can be prevented beforehand.

The inner gear 33 is slightly rotatably fitted to the outer periphery of the output shaft 22 at a portion located axially outside portions where the cam surfaces 22b are formed (located opposite to the lever-side clutch part 11).

On the other hand, a cam mechanism 34 that controls meshing of the output shaft 22 with the inner gear 33 and release of the meshing state by moving the slide gear 32 in the axial direction is interposed between the slide gear 32 and the outer ring 14 of the lever-side clutch part 11.

Figure 6:
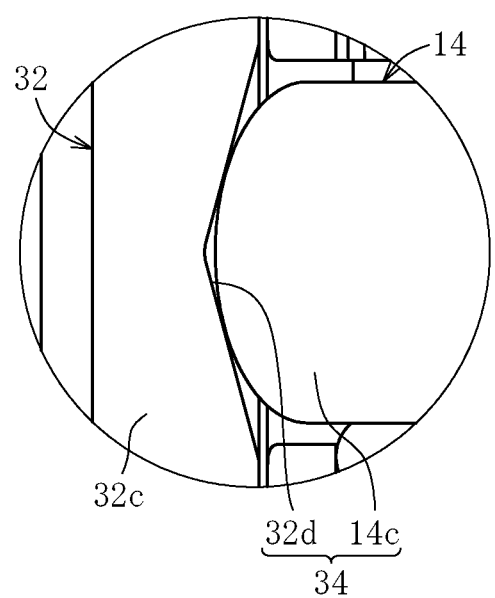
FIG. 6 is an enlarged plan view of an essential part showing a portion X in FIG. 1.

As shown in FIGS. 5 and 6, the cam mechanism 34 includes a V-shaped cam groove 32d formed on an end surface of the brim 32c of the slide gear 32 and a protrusion 14c extending from an outer periphery of the outer ring 14 (see FIG. 1) in the axial direction. In the cam mechanism 34, a curved tip of the protrusion 14c of the outer ring 14 is made to abut on a cam surface of the cam groove 32d of the slide gear 32.

Here, when the slide gear 32 moves in the axial direction, the slide gear 32 comes into contact with the inner gear 33 and the outer ring 14, for example, the protrusion 14c of the outer ring 14 abuts on the cam groove of the slide gear 32. Accordingly, abnormal noise may occur due to the contact between the slide gear 32 and both of the inner gear 33 and the outer ring 14.

Therefore, in order to suppress the abnormal noise caused by the contact between the slide gear 32 and both of the inner gear 33 and the outer ring 14, application of a resin coating material to the slide gear 32 or application of the resin coating material to the inner gear 33 and the outer ring 14 is effective.

Note that the resin coating material may be applied to the slide gear 32 and both of the inner gear 33 and the outer joint member outer ring 14.

As shown in FIG. 1, a wave spring 35 that elastically biases the slide gear 32 in a direction in which the slide gear 32 meshes with the inner gear 33 of the output shaft 22 is interposed between the side plate 25 of the brake-side clutch part 12 and the slide gear 32.

As the wave spring 35, for example, a ring-shaped wave spring is suitable. By pressing the slide gear 32 against the outer ring 23 by elastic force of the wave spring 35, the internal teeth 32a of the slide gear 32 and the external teeth 33a of the inner gear 33 are meshed with each other.

As described above, by pressing the slide gear 32 against the outer ring 23 by the elastic force of the wave spring 35, a meshing state between the internal teeth 32a of the slide gear 32 and the external teeth 33a of the inner gear 33 can be stabilized.

Note that when the internal teeth 32a of the slide gear 32 and the external teeth 33a of the inner gear 33 are meshed with each other, the elastic force of the wave spring 35 may cause the slide gear 32 to collide with the female gear member provided in the stationary member meshes with the male gear member of the output member, outer ring 23, thereby generating impact noise.

Therefore, in order to suppress the impact noise caused by the collision between the slide gear 32 and the outer ring 23, a structure in which either the slide gear 32 or the outer ring 23 is provided with a projection for reducing a contact area when the slide gear 32 comes into contact with the outer ring 23 is effective.

Figure 8:
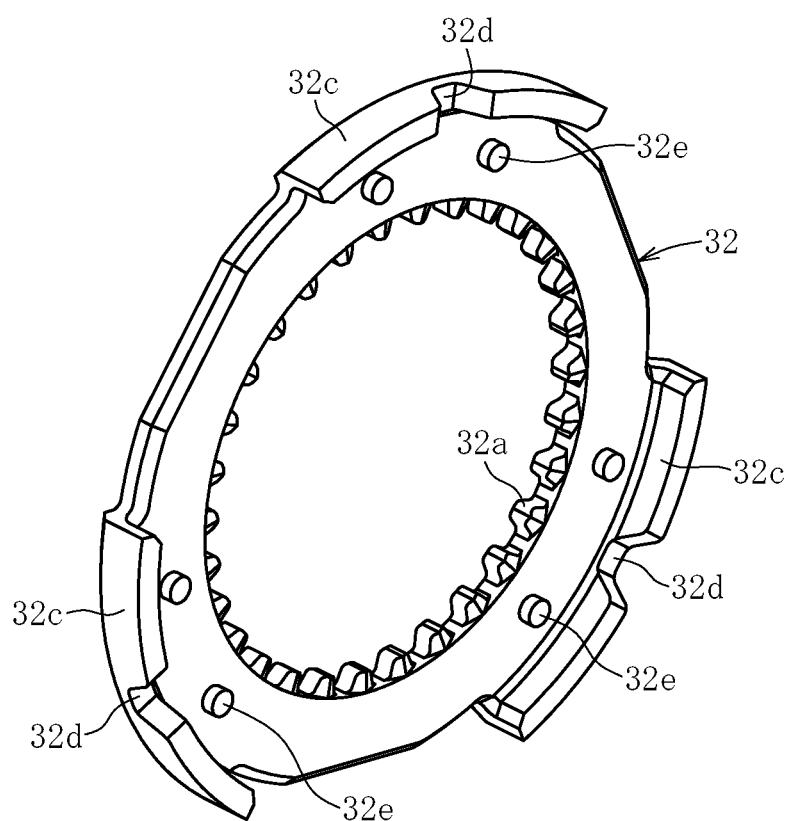
FIG. 8 is a perspective view showing a slide gear provided with projections according to another embodiment of the present invention.

FIG. 8 illustrates a case where a plurality of projections 32e is arranged on an outer ring contact surface of the slide gear 32 in the circumferential direction. The plurality of projections may be arranged on a slide gear contact surface of the outer ring 23 in the circumferential direction. Note that the number and positions of the projections 32e are arbitrary and not limited to those in the illustrated example.

In this manner, by providing projections on either the slide gear 32 or the outer ring 23, when the internal teeth 32a of the slide gear 32 and the external teeth 33a of the inner gear 33 mesh with each other, a contact area when the slide gear 32 comes into contact with the outer ring 23 is reduced. Accordingly, it is possible to suppress impact noise caused by a collision between the slide gear 32 and the outer ring 23.

In the clutch unit 10 shown in FIG. 1, the outer ring 14 is maintained in a neutral state by the outer centering spring 19 in a state where rotational torque is not input from the outer ring 14 of the lever-side clutch part 11.

At this time, in the cam mechanism 34, the protrusion 14c of the outer ring 14 and the cam groove 32d of the slide gear 32 are at neutral positions (see FIG. 6).

Therefore, the slide gear 32 is pressed in the axial direction by the elastic force of the wave spring 35, and the internal teeth 32a of the slide gear 32 and the external teeth 33a of the inner gear 33 mesh with each other (see FIG. 1). As a result, the output shaft 22 is locked.

In a state in which the output shaft 22 is locked, and in a state of being seated on the seat 40 (see FIG. 4), even when an impact load is applied to the brake-side clutch part 12 at the time of a vehicle rear-end collision and excessive rotational torque is reversely input to the output shaft 22 instantaneously, or even when forward rotational torque and reverse rotational torque are reversely input to the output shaft 22 in an alternately continuous state due to vertical vibrations generated during running of the vehicle on a bad road or the like, the internal teeth 32a of the slide gear 32 mesh with the external teeth 33a of the inner gear 33, so that the output shaft 22 can be kept locked.

Thereby, even when a contact position of the cylindrical roller 27 between the outer ring 23 and the output shaft 22 is slightly shifted, or even when there is hysteresis of elastic deformation in the output shaft 22 on which rotational torque is loaded, the outer ring 23, and the cylindrical roller 27, the output shaft 22 can be prevented from gradually rotating due to the meshing between the internal teeth 32a of the slide gear 32 and the external teeth 33a of the inner gear 33. As a result, it is possible to prevent a phenomenon that the seat 40 is slightly lowered.

Further, the meshing between the internal teeth 32a of the slide gear 32 and the external teeth 33a of the inner gear 33 allows the output shaft 22 to continue to be locked even if an impact load is reversely input to the output shaft 22, so that a large capacity of torque load can be applied to the brake-side clutch part 12.

As a result, the number of the plurality of pairs of cylindrical rollers 27 constituting the brake-side clutch part 12, that is, the cylindrical rollers 27 having a function of controlling cutoff and transmission of normal rotational torque can be reduced, and light weight, compactness, and cost reduction of the clutch unit 10 can be achieved.

On the other hand, when rotational torque is input from the outer ring 14 of the lever-side clutch part 11, there is a phase shift between the protrusion 14c of the outer ring 14 and the cam groove 32d of the brim 32c of the slide gear 32 in the cam mechanism 34 of the brake-side clutch part 12.

Figure 7:
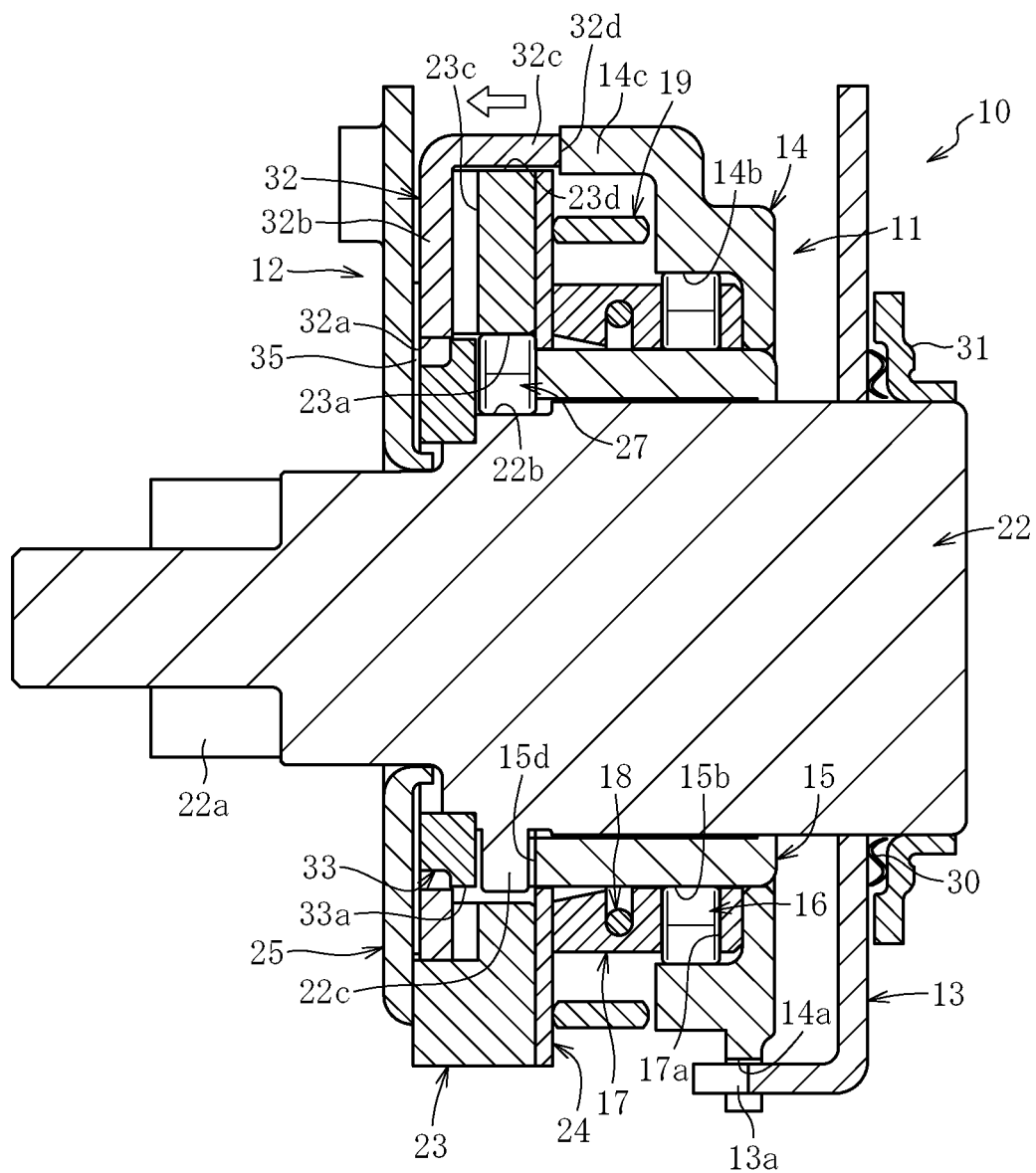
FIG. 7 is a cross-sectional view showing an operation state of the clutch unit in FIG. 1.

Thereby, as shown in FIG. 7, the slide gear 32 moves in the axial direction so as to approach the side plate 25 against the elastic force of the wave spring 35 (see a white arrow in the figure).

Due to the axial movement of the slide gear 32, the internal teeth 32a of the slide gear 32 disengage from the external teeth 33a of the inner gear 33, and the meshing state between the internal teeth 32a of the slide gear 32 and the external teeth 33a of the inner gear 33 is released. As a result, the output shaft 22 becomes rotatable with respect to the outer ring 23.

Further, when the inner ring 15 of the lever-side clutch part 12 rotates, as described above, the recessed hole 15d of the inner ring 15 and the projection 22c of the output shaft 22 are engaged and transmitted to the output shaft 22, thereby rotating the output shaft 22. As a result, the seat height of the seat 40 can be adjusted.

Note that immediately after the internal teeth 32a of the slide gear 32 are disengaged from the external teeth 33a of the inner gear 33, in the brake-side clutch part 12, the cylindrical rollers 27 are engaged with the wedge clearance 26 between the outer ring 23 and the output shaft 22. Therefore, even if rotational torque is reversely input to the output shaft 22 at this point, the output shaft 22 is locked.

Thereafter, when the internal teeth 32a of the slide gear 32 are completely disengaged from the external teeth 33a of the inner gear 33 due to the axial movement of the slide gear 32, the cylindrical rollers 27 are separated from the wedge clearance 26 between the outer ring 23 and the output shaft 22. Therefore, abnormal noise such as rattling noise does not occur between the slide gear 32 and the output shaft 22 during lever operation.

As described above, in the brake-side clutch part 12, it is necessary to have not only a structure in which the internal teeth 32a of the slide gear 32 and the external teeth 33a of the inner gear 33 are meshed with each other, but also a structure in which the cylindrical rollers 27 are engaged with the wedge clearance 26 between the outer ring 23 and the output shaft 22.

Figure 9:
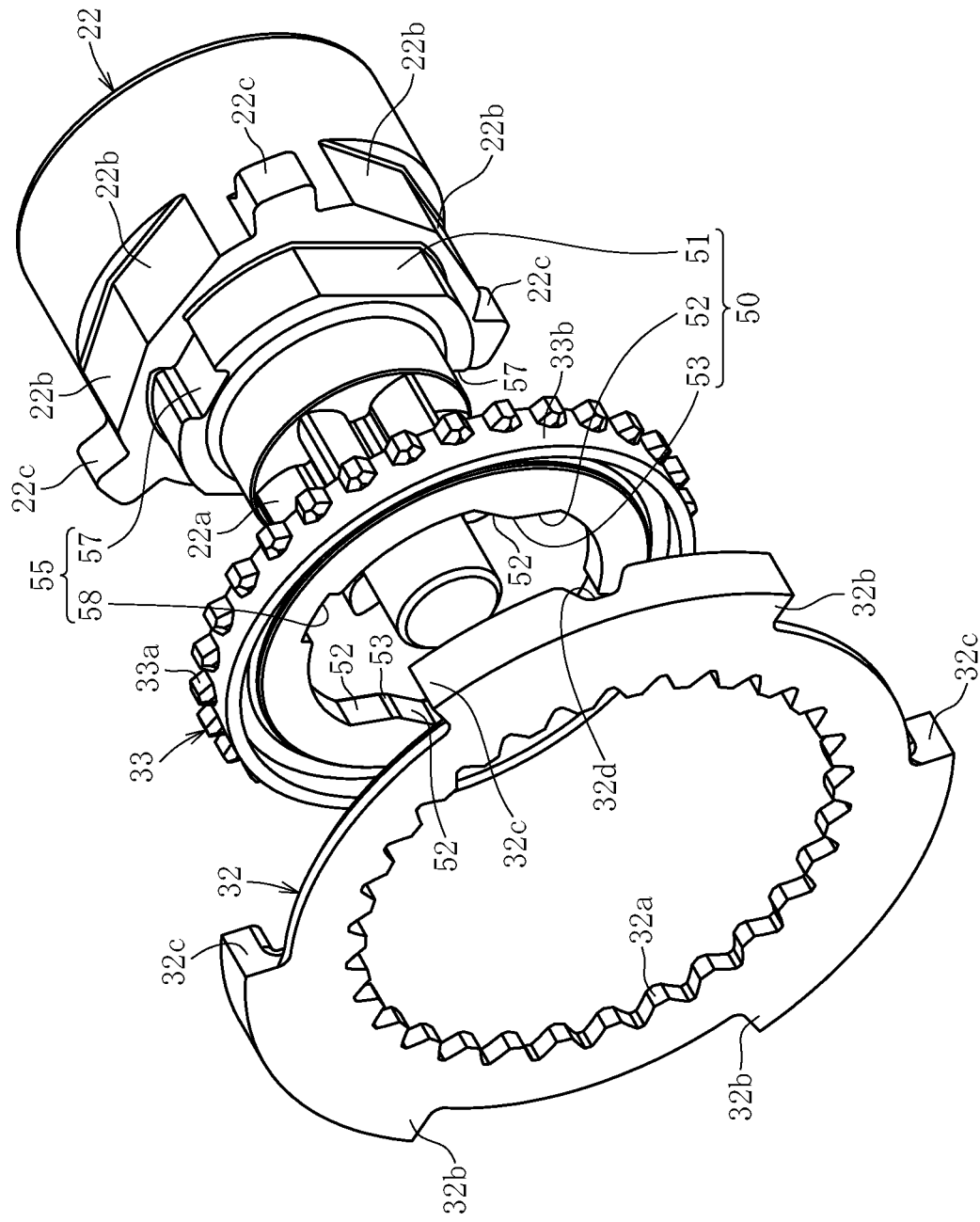
FIG. 9 is an exploded perspective view showing the slide gear, an inner gear provided with a guide part, and the output shaft in another embodiment of the present invention.

As shown in FIG. 9, a structure in which the inner gear 33 is provided with a guide part 33b for axially aligning the slide gear 32 with the inner gear 33 during the axial movement of the slide gear 32 is effective. The guide part 33b has a cylindrical shape extending integrally from a portion where the external teeth 33a are formed to the output side, and tips of the internal teeth 32a of the slide gear 32 are slidably in contact with an outer peripheral surface thereof.

By providing the guide part 33b in the inner gear 33, when the slide gear 32 moves in the axial direction, the tips of the internal teeth 32a of the slide gear 32 are slidably in contact with the outer peripheral surface of the guide part 33b of the inner gear 33, so that the slide gear 32 can be axially aligned with the inner gear 33. As a result, it is possible to prevent axial misalignment of the slide gear 32 with the inner gear 33.

Figure 10:
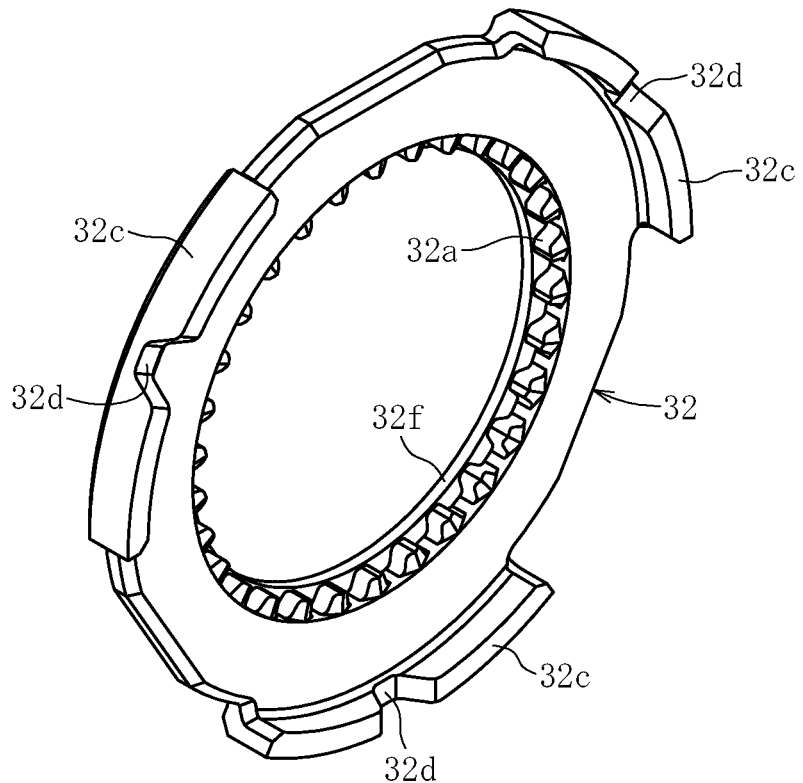
FIG. 10 is a perspective view showing a slide gear provided with a guide part according to another embodiment of the present invention.

Further, a structure in which the inner gear 33 is provided with the guide part 33b (hereinafter, referred to as a first guide part 33b) and, as shown in FIG. 10, the slide gear 32 is also provided with a guide part 32f (hereinafter, referred to as a second guide part 32f) is effective. The second guide part 32f has a cylindrical shape extending integrally from a portion where the internal teeth 32a are formed to the output side, and the outer peripheral surface of the first guide part 33b (see FIG. 9) is slidably in contact with an inner peripheral surface thereof.

Figure 11:
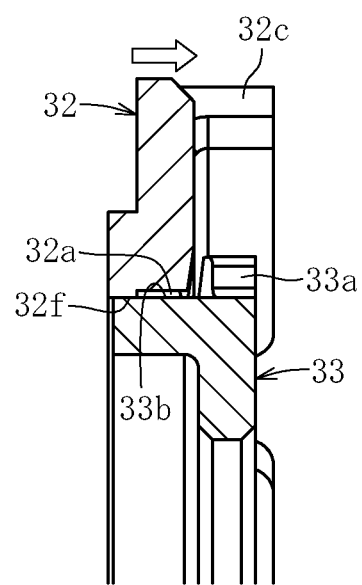
FIG. 11 is a partial cross-sectional view showing a state where the slide gear moves with respect to the inner gear in an axial direction.

By providing the second guide part 32f in the slide gear 32, when the slide gear 32 moves in the axial direction, as shown in FIG. 11, a tip of the internal tooth 32a of the slide gear 32 is slidably in contact with the outer peripheral surface of the first guide part 33b of the inner gear 33, and the inner peripheral surface of the second guide part 32f is slidably in contact with the outer peripheral surface of the first guide part 33b, so that the slide gear 32 can be more easily axially aligned with the inner gear 33. As a result, axial misalignment of the slide gear 32 with the inner gear 33 can be further prevented.

Figure 12:
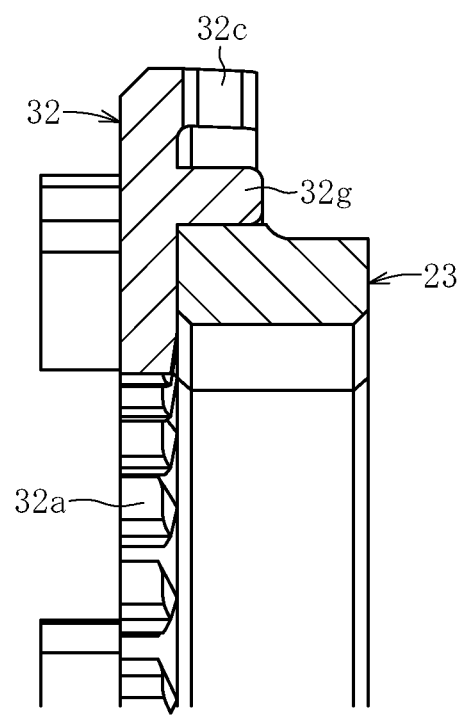
FIG. 12 is a partial cross-sectional view showing a state where the slide gear moves in the axial direction with respect to an outer ring in another embodiment of the present invention.

Note that, as shown in FIG. 12, the slide gear 32 may be provided with a guide part 32g for axially aligning the slide gear 32 with the outer ring 23 when the slide gear 32 moves in the axial direction. The guide part 32g is provided radially inside the brim 32c of the slide gear 32 to protrude toward the input side, and the outer peripheral surface of the outer ring 23 is slidably in contact with an inner peripheral surface thereof.

By providing the guide part 32g in the slide gear 32, when the slide gear 32 moves in the axial direction, the inner peripheral surface of the guide part 32g is slidably in contact with the outer peripheral surface of the outer ring 23, so that the slide gear 32 can be axially aligned with the outer ring 23. As a result, axial misalignment of the slide gear 32 with the outer ring 23 can be prevented.

Further, since the slide gear 32 moves in the axial direction by elastic force of the wave spring 35, a structure in which the wave spring 35 is axially aligned with the slide gear 32 is effective.

Figure 13:
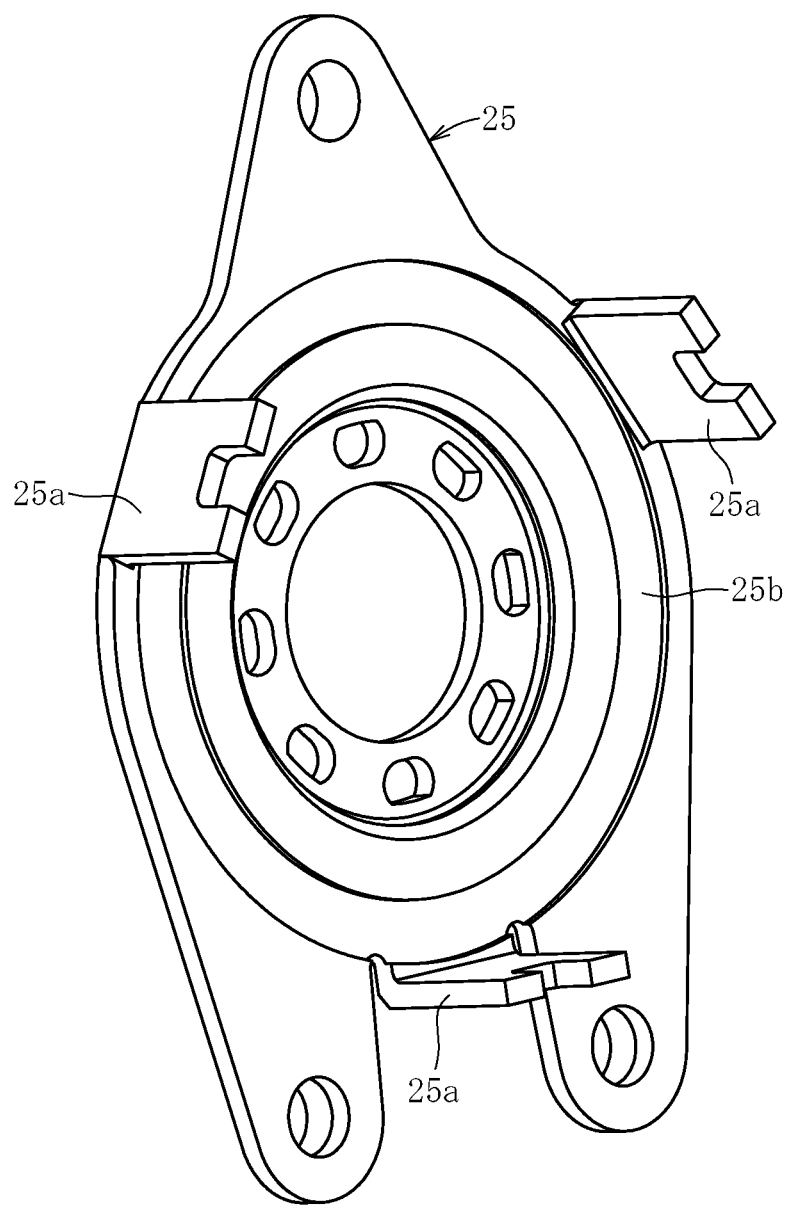
FIG. 13 is a perspective view showing a side plate provided with a guide groove in another embodiment of the present invention.

As an example of this structure, as shown in FIG. 13, a guide groove 25b for guiding the wave spring 35 may be provided on an inner surface of the side plate 25 (see FIG. 1), that is, a surface where the wave spring 35 abuts.

Accordingly, the wave spring 35 fitted in the guide groove 25b of the side plate 25 is positioned with respect to the slide gear 32, so that the wave spring 35 can be axially aligned with the slide gear 32, and axial misalignment of the slide gear 32 with the inner gear 33 can be further prevented.

Figure 14:
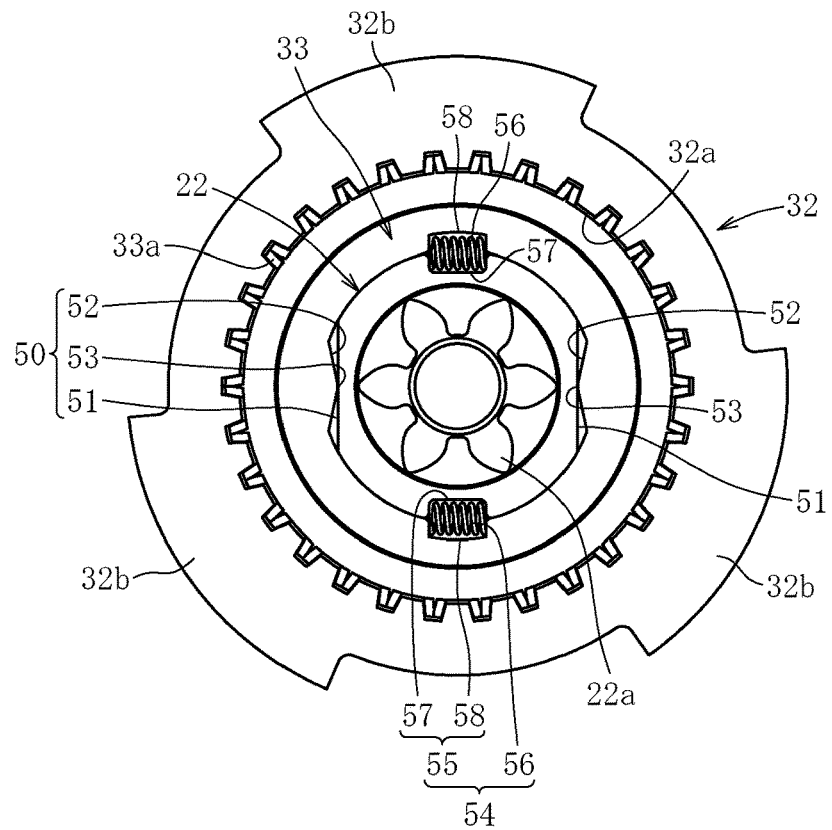
FIG. 14 is a side view of the slide gear, the inner gear, the coil spring, and the output shaft of FIG. 5 as viewed from an output side, and showing a state where the inner gear is at a neutral position.

Here, in the brake-side clutch part 12, as shown in FIGS. 5 and 14, between the inner gear 33 and the output shaft 22, an alignment part 50 for aligning a phase of the inner gear 33 with that of the slide gear 32 when rotational torque is cut off and a centering part 54 for returning the inner gear 33 to a neutral position with respect to the output shaft 22 when rotational torque is transmitted are provided.

The alignment part 50 includes a flat surface 51 formed on an opposite side of an outer peripheral portion of the output shaft 22 by 180° and an inclined surface 52 formed on an inner peripheral opposed portion of the inner gear 33 so as to correspond to the flat surface 51 of the output shaft 22.

The two inclined surfaces 52 are formed continuously along forward and reverse rotation directions of the inner gear 33, and each have a linear tapered shape extending in the rotation direction from a central portion 53 thereof. In other words, the central portion 53 of the two inclined surfaces 52 is the most protruded portion. By providing the two inclined surfaces 52, it is possible to cope with both forward and reverse directions of rotational torque.

When the inner gear 33 is at the neutral position with respect to the output shaft 22 (see FIG. 14), the central portion 53 of the two inclined surfaces 52 of the inner gear 33 abuts on the flat surface 51 of the output shaft 22.

On the other hand, when the inner gear 33 is maximally displaced in the rotation direction with respect to the output shaft 22 (see FIG. 15), either of the inclined surfaces 52 of the inner gear 33 is in close contact with the flat surface 51 of the output shaft 22. This state stops the rotation, and when the output shaft 22 rotates, the inner gear 33 also rotates.

In the alignment part 50, phase alignment is performed by slightly rotating the inner gear 33 with respect to the output shaft 22 between the abutment state (see FIG. 14) and the close contact state (see FIG. 15) of the flat surface 51 of the output shaft 22 and the inclined surface 52 of the inner gear 33. With such a simple structure, the phase alignment of the inner gear 33 with the output shaft 22 can be easily realized.

Figure 16:
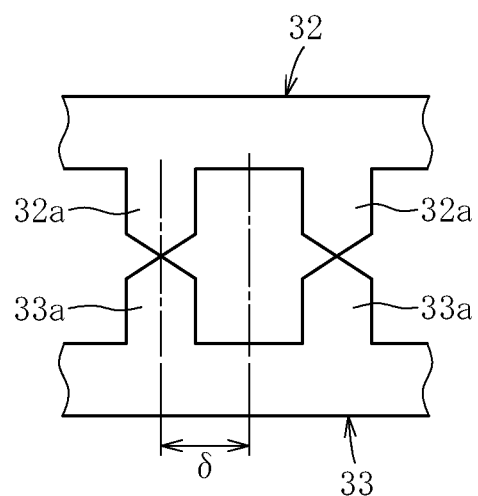
FIG. 16 is a schematic view showing a phase shift state between the slide gear and the inner gear.

As shown in FIG. 16, even when a phase shift between the slide gear 32 and the inner gear 33 is maximized (a state where the tips of the internal teeth 32a of the slide gear 32 and the external teeth 33a of the inner gear 33 abut against each other), an alignment amount δ may be set so that the internal teeth 32a of the slide gear 32 and the external teeth 33a of the inner gear 33 can mesh with each other.

For example, when the number of teeth of the slide gear 32 and the inner gear 33 is 30, 360°/number of teeth=12°, and the alignment amount δ is 12°/2=6°.

Also, it is preferable that contact surfaces between the internal teeth 32a of the slide gear 32 and the external teeth 33a of the inner gear 33 each have a shape having no flat part, for example, a dog shape such as a mountain shape so that, when the slide gear 32 moves in the axial direction, even when the tips of the internal teeth 32a of the slide gear 32 and the external teeth 33a of the inner gear 33 abut against each other, the inner gear 33 can easily rotate slightly.

Thus, when the slide gear 32 moves in the axial direction, even when the tips of the internal teeth 32a of the slide gear 32 and the external teeth 33a of the inner gear 33 abut against each other, the phase alignment of the inner gear 33 with the output shaft 22 becomes easy, and the internal teeth 32a of the slide gear 32 and the external teeth 33a of the inner gear 33 mesh with each other.

The centering part 54 has a structure in which a storing part 55 is formed between the output shaft 22 and the inner gear 33 and a coil spring 56 as an elastic member that elastically biases the inner gear 33 toward the output shaft 22 in the rotation direction is arranged in the storing part 55.

The storing part 55 includes a recess 57 formed on the outer peripheral portion of the output shaft 22 and a recess 58 formed on the inner peripheral surface of the inner gear 33.

In the centering part 54, centering is performed by slightly rotating the inner gear 33, which is displaced in the rotation direction with respect to the output shaft 22, with respect to the output shaft 22 by elastic force of the coil spring 56. With such a simple structure, the centering of the inner gear 33 with respect to the output shaft 22 can be easily realized.

The alignment part 50 and the centering part 54 configured as described above function as follows when rotational torque is cut off and transmitted.

When the rotational torque is cut off, as shown in FIG. 16, there is a case where a phase shift occurs between the slide gear 32 moving in the axial direction (direction perpendicular to a paper surface of the drawing) and the inner gear 33 and the internal teeth 32a of the slide gear 32 and the external teeth 33a of the inner gear 33 do not mesh with each other.

FIG. 16 illustrates a state in which the slide gear 32 and the inner gear 33 are maximally out of phase with each other, that is, a state in which the tips of the internal teeth 32a of the slide gear 32 and the external teeth 33a of the inner gear 33 abut on each other.

In this manner, even when the internal teeth 32a of the slide gear 32 do not mesh with the external teeth 33a of the inner gear 33, the alignment part 50 slightly rotates the inner gear 33 with respect to the output shaft 22, so that the inner gear 33 can be meshed with the slide gear 32.

In other words, as shown in FIG. 14, the inner gear 33 slightly rotates with respect to the output shaft 22 against the elastic force of the coil spring 56 from the state where the inner gear 33 is at the neutral position with respect to the output shaft 22. In the alignment part 50 in the state shown in FIG. 14, the central portion 53 of the two inclined surfaces 52 of the inner gear 33 abuts on the flat surface 51 of the output shaft 22.

Here, elastic force of the wave spring 35, that is, axial pressing force on the slide gear 32 is set to be greater than the elastic force of the coil spring 56 described above. Therefore, as described above, the inner gear 33 slightly rotates against the elastic force of the coil spring 56, and at the same time, the slide gear 32 moves in the axial direction.

Figure 15:
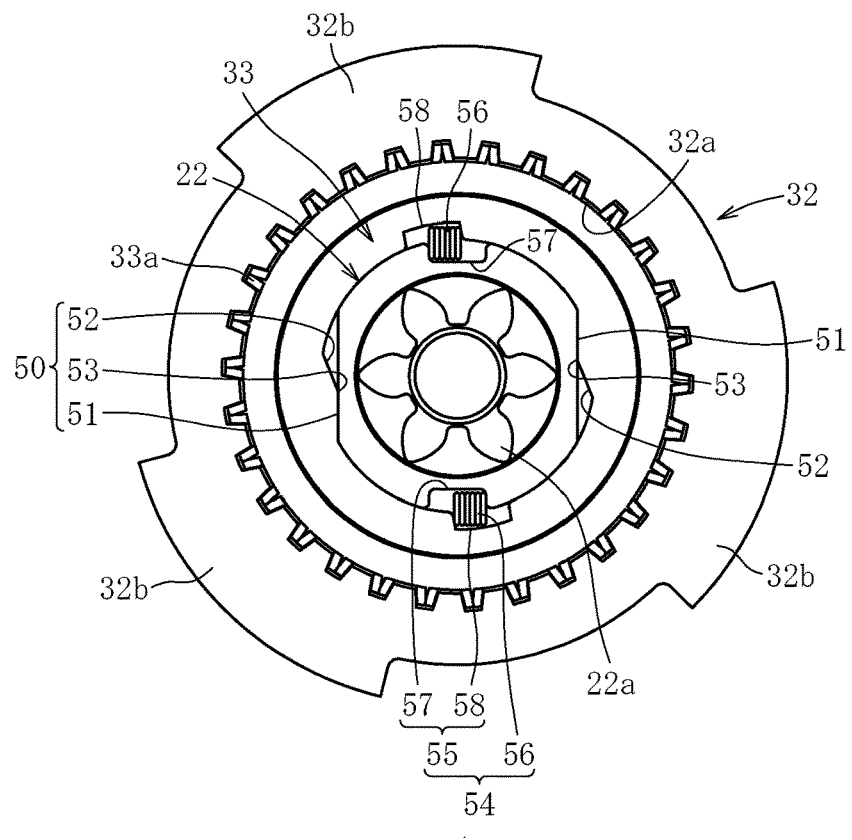
FIG. 15 is a side view of the slide gear, the inner gear, the coil spring, and the output shaft of FIG. 5 as viewed from the output side, and showing a state where the inner gear is displaced.
Figure 17:
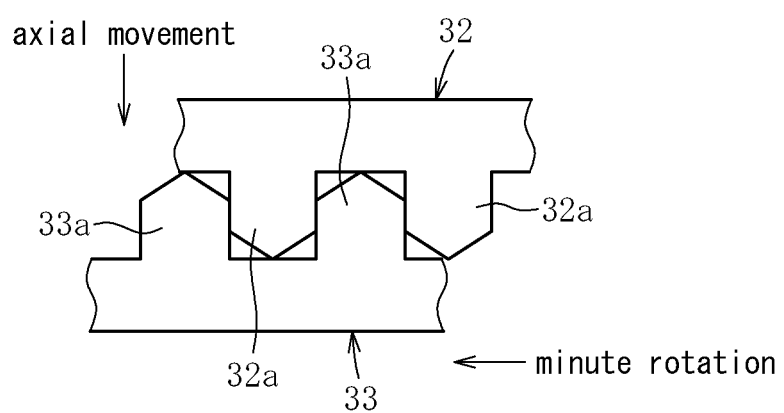
FIG. 17 is a schematic view showing a phase alignment state between the slide gear and the inner gear.

Due to the minute rotation of the inner gear 33 and the axial movement of the slide gear 32, in the alignment part 50, one inclined surface 52 of the inner gear 33 comes into close contact with the flat surface 51 of the output shaft 22, as shown in FIG. 15. In this way, as shown in FIG. 17, the internal teeth 32a of the slide gear 32 and the external teeth 33a of the inner gear 33 mesh with each other.

As described above, the internal teeth 32a of the slide gear 32 and the external teeth 33a of the inner gear 33 can be meshed with each other. At this time, the inner gear 33 whose phase has been aligned with that of the slide gear 32 by the alignment part 50 is in a state of being displaced in the rotation direction with respect to the output shaft 22.

Therefore, when the rotational torque is transmitted, the centering part 54 slightly rotates the inner gear 33 with respect to the output shaft 22 in a direction opposite to the direction when the rotational torque is cut off, so that the inner gear 33 can be returned to the neutral position with respect to the output shaft 22.

In other words, at the time of transmitting the rotational torque, due to the input of the rotational torque from the outer ring 14 of the lever-side clutch part 11, the cam mechanism 34 allows the slide gear 32 to move in the axial direction so as to approach the side plate 25 against the elastic force of the wave spring 35.

Due to the axial movement of the slide gear 32, the internal teeth 32a of the slide gear 32 are disengaged from the external teeth 33a of the inner gear 33. With the disengagement of the slide gear 32, the inner gear 33 becomes free in the rotation direction.

As a result, the inner gear 33 slightly rotates with respect to the output shaft 22 by the elastic force of the coil spring 56 of the centering part 54.

Due to this minute rotation, a state is shifted from the state where the inclined surface 52 of the inner gear 33 is in close contact with the flat surface 51 of the output shaft 22 (see FIG. 15) to the state where the central portion 53 of the two inclined surfaces 52 of the inner gear 33 abuts on the flat surface 51 of the output shaft 22 (see FIG. 14).

In this way, by returning the inner gear 33 to the neutral position with respect to the output shaft 22, even when the phase shift occurs between the external teeth 33a of the inner gear 33 and the internal teeth 32a of the slide gear 32 when the next rotational torque is cut off, the alignment part 50 can align the phase of the inner gear 33 with that of the slide gear 32.

Figure 18:
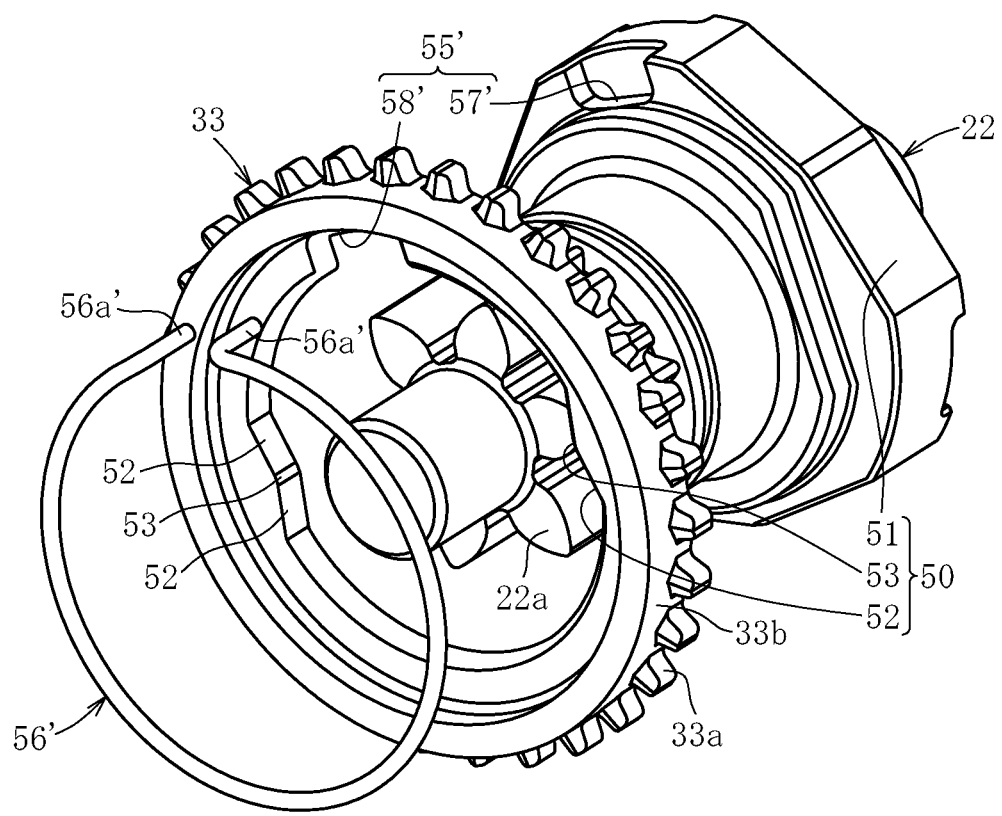
FIG. 18 is an exploded perspective view showing a ring spring, an inner gear, and an output shaft according to another embodiment of the present invention.

In the above embodiments, a case where the coil spring 56 is used as the centering part 54 is exemplified. However, the present invention is not limited to this. Instead of the coil spring 56, it is also possible to use a ring spring 56' as shown in FIG. 18.

The ring spring 56' is a C-shaped elastic member having a circular cross section that can be reduced in diameter, and has a shape in which both ends 56a' are bent and extended in the axial direction. Both the ends 56a' of the ring spring 56' are inserted in a storing part 55' including a recess 57' formed on the outer peripheral portion of the output shaft 22 and a recess 58' formed on the inner peripheral surface of the inner gear 33 and are locked in the rotation direction.

Figure 19:
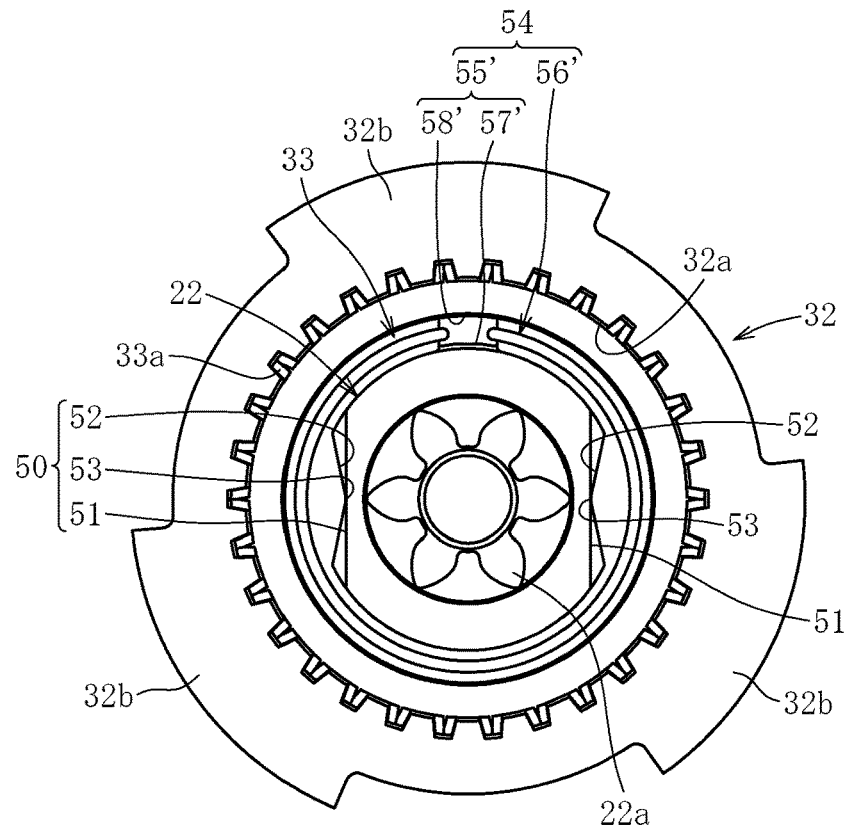
FIG. 19 is a side view of the ring spring, the slide gear, the inner gear, and the output shaft of FIG. 18 as viewed from an output side, and showing a state where the inner gear is at a neutral position.

In the embodiment using the ring spring 56', when rotational torque is cut off, in a case where the internal teeth 32a and the external teeth 33a are not meshed due to a phase shift between the slide gear 32 and the inner gear 33, the inner gear 33 slightly rotates with respect to the output shaft 22 against elastic force of the ring spring 56' from a state in which the inner gear 33 is at a neutral position with respect to the output shaft 22 (see FIG. 19), and the slide gear 32 moves in the axial direction.

Figure 20:
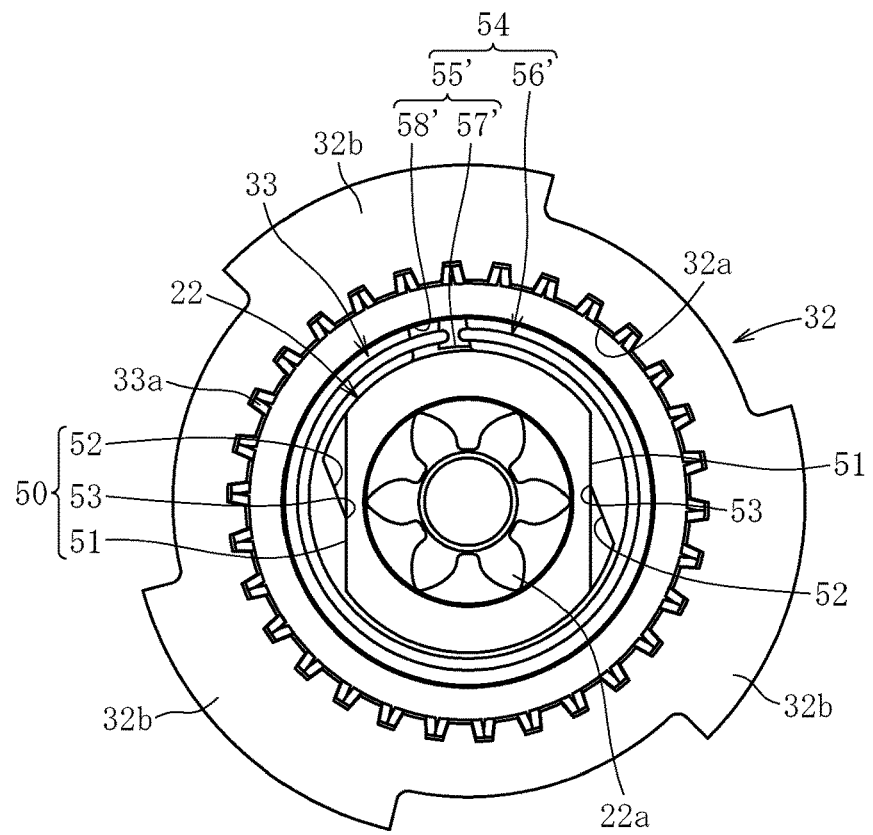
FIG. 20 is a side view of the ring spring, the slide gear, the inner gear, and the output shaft of FIG. 18 as viewed from the output side, and showing a state where the inner gear is displaced.

The minute rotation of the inner gear 33 and the axial movement of the slide gear 32 cause the internal teeth 32a of the slide gear 32 and the external teeth 33a of the inner gear 33 to mesh with each other. At this time, the inner gear 33 whose phase has been aligned with that of the slide gear 32 by the alignment part 50 is displaced in the rotation direction with respect to the output shaft 22, and the ring spring 56' is in a reduced diameter state (see FIG. 20).

On the other hand, when rotational torque is transmitted, due to an input of the rotational torque from the outer ring 14 of the lever-side clutch part 11, the slide gear 32 moves in the axial direction against elastic force of the wave spring 35, and the internal teeth 32a of the slide gear 32 are disengaged from the external teeth 33a of the inner gear 33. With the disengagement of the slide gear 32, the inner gear 33 becomes free in the rotation direction.

As a result, due to the elastic force of the ring spring 56' of the centering part 54, the inner gear 33 slightly rotates with respect to the output shaft 22 in a direction opposite to the direction when the rotational torque is cut off. A state is shifted from the state shown in FIG. 20 to the state shown in FIG. 19 by this minute rotation, whereby the inner gear 33 can be returned to the neutral position with respect to the output shaft 22.

It is needless to say that the present invention is not limited to the above-described embodiments at all, and can be embodied in various forms without departing from the gist of the present invention. The scope of the present invention is described in the claims, and further includes the equivalent meanings described in the claims and all the changes within the scope.

The invention claimed is:

1. A clutch unit comprising:
   an input-side clutch part that controls transmission and cutoff of input rotational torque; and
   an output-side clutch part that transmits rotational torque from the input-side clutch part to an output side and cuts off rotational torque reversely input from the output side,
   wherein the output-side clutch part comprises:
      a stationary member whose rotation is restricted; and
      an output member from which rotation is output,
   wherein the stationary member is provided with a female gear member that meshes with the output member when rotational torque is cut off and releases a meshing state with the output member when rotational torque is transmitted,
   wherein the output member is provided with a male gear member that meshes with the female gear member, the male gear member being fitted to an outer periphery of the output member so as to be slightly rotatable with respect to the output member,
   wherein an alignment part that aligns a phase of the male gear member with a phase of the female gear member when rotational torque is cut off is provided between the male gear member and the output member, and wherein a centering part that returns the male gear member to a neutral position with respect to the output member when rotational torque is transmitted are provided between the male gear member and the output member.

2. The clutch unit according to claim 1, wherein the alignment part has a structure which includes a flat surface formed on the output member and an inclined surface formed on the male gear member and in which the inclined surface is made to abut on the flat surface.

3. The clutch unit according to claim 1, wherein the centering part has a structure in which a storing part is formed between the output member and the male gear member and an elastic member that elastically biases the male gear member toward the output member in a rotation direction is disposed in the storing part.

4. The clutch unit according to claim 3, wherein the elastic member has a C-shape having both ends bent and extended in an axial direction, and both the ends are inserted into the storing part and locked in the rotation direction.

5. The clutch unit according to claim 1, wherein either of the male gear member or the and the female gear member is provided with a guide part that axially aligns the female gear member with the male gear member when the female gear member moves in an in the axial direction.

6. The clutch unit according to claim 1, wherein the input-side clutch part and the output-side clutch part are incorporated in an automobile seat lifter.

\* \* \* \* \*